United States Patent
Harichandra Babu et al.

(10) Patent No.: US 11,971,917 B2
(45) Date of Patent: Apr. 30, 2024

(54) AUTOMATIC QUOTING OR FORKING OF CHATS USING DEEP LEARNING IN CLOUD BASED CHAT APPLICATIONS

(71) Applicant: Cisco Technology, Inc., San Jose, CA (US)

(72) Inventors: Karthik Babu Harichandra Babu, Chingelput (IN); Akaash Dev S C, Chengalpet (IN); Amit Kumar, Chennai (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 17/227,781

(22) Filed: Apr. 12, 2021

(65) Prior Publication Data
US 2022/0327285 A1    Oct. 13, 2022

(51) Int. Cl.
*G06F 16/383* (2019.01)
*G06F 16/338* (2019.01)

(52) U.S. Cl.
CPC .......... *G06F 16/383* (2019.01); *G06F 16/338* (2019.01)

(58) Field of Classification Search
CPC ...... G06F 40/289; G06F 40/284; G06F 40/30; G06F 3/048; G06F 16/338; G06F 16/383; G06N 20/00; H04L 51/216
See application file for complete search history.

(56) References Cited

U.S. PATENT DOCUMENTS

| | | | |
|---|---|---|---|
| 7,849,144 B2 | 12/2010 | Prejapat et al. | |
| 8,006,191 B1* | 8/2011 | Anderson | H04L 12/1827 715/753 |
| 10,410,016 B1* | 9/2019 | Damick | H04L 63/0435 |
| 10,503,831 B2 | 12/2019 | Henderson et al. | |
| 11,343,208 B1* | 5/2022 | Shetty | H04L 51/02 |
| 2016/0094492 A1 | 3/2016 | Li et al. | |
| 2017/0149967 A1* | 5/2017 | Chandrasekaran | H04L 67/54 |
| 2017/0242886 A1 | 8/2017 | Jolley et al. | |

(Continued)

OTHER PUBLICATIONS

Vinkler, Mikael Lundell, et al., "Conversational Chatbots with Memory-based Question and Answer Generation," Department of Science and Technology, Linkoping University, LiU-ITN-TEK-A--20/060-SE, Nov. 13, 2020, 132 pages.

*Primary Examiner* — Grace Park
(74) *Attorney, Agent, or Firm* — Edell, Shapiro & Finnan, LLC

(57) ABSTRACT

Presented herein are techniques for a non-intruding auto quoting feature on-the-fly for chat applications based on previous conversations and effectively forking/quoting such conversations to ease the burden of the user going through all the chat history. The techniques may involve monitoring an ongoing first text communication session between a first user and at least one second user; detecting one or more salient words or phrases in the first text communication session based on the monitoring; based on the one or more salient words or phrases, identifying a second text communication session that is topically related to the first text communication session; and displaying in a user interface presented to the first user a prompt to quote relevant content from the second text communication session into the first text communication session or to fork the first user to be a participant in the second text communication session.

20 Claims, 8 Drawing Sheets

(56) References Cited

U.S. PATENT DOCUMENTS

| | | |
|---|---|---|
| 2018/0159812 A1* | 6/2018 | Sarafa .................... H04L 51/066 |
| 2019/0035403 A1* | 1/2019 | Ramasamy ............. G10L 15/30 |
| 2019/0075141 A1* | 3/2019 | Albouyeh ............... H04L 43/16 |
| 2020/0125632 A1 | 4/2020 | Ning et al. |
| 2020/0356838 A1 | 11/2020 | Selvakumar |

* cited by examiner

AUTOMATIC QUOTING OR FORKING OF CHATS USING DEEP LEARNING IN CLOUD BASED CHAT APPLICATIONS

TECHNICAL FIELD

The present disclosure relates to collaboration services, such as chat or instant message services.

BACKGROUND

Users, particularly in an enterprise setting, use chat applications to communicate with colleagues. Sometimes users need to search through chat messages (older messages) to obtain an answer to a question that may have previously arisen. It is desirable to automate functions related to searching through existing chat messages to improve chat service and user efficiency.

DESCRIPTION OF EXAMPLE EMBODIMENTS

Overview

Presented herein are techniques for a non-intruding auto quoting feature on-the-fly for chat applications based on previous conversations and effectively forking/quoting such conversations to ease the burden of the user going through all the chat history.

In one form, a computer-implemented method is provided. The method includes monitoring an ongoing first text communication session between a first user and at least one second user; detecting one or more salient words or phrases in the first text communication session based on the monitoring; based on the one or more salient words or phrases, identifying a second text communication session that is topically related to the first text communication session; and displaying in a user interface presented to the first user a prompt to quote relevant content from the second text communication session into the first text communication session or to fork the first user to be a participant in the second text communication session.

Example Embodiments

Quoting is a chat service function in which the chat service copies and "forwards" a message from another user. The challenge is to find the right message from the right person.

Forking is another chat service function. Forked chats are chats in which a user can create a new chat from an existing chat conversation (1-1 chat session, Group Chat session, Channel session). Forking is similar to quoting, except that it applies to threads instead of messages, with possible unification of participants. Currently, forking is done manually from the point in which a user thinks to share the chat with one or more other users. Again, the challenge is finding the right person and right thread to which to fork a user.

Current chat services lack the pro-activeness to suggest the chat messages to "quote from" or "fork to" automatically, and also doing so without interrupting an ongoing chat conversation.

Accordingly, non-intrusive auto quoting and forking functions for chat applications are provided. The non-intrusive aspect means that the service does not edit a user's current message based on external intelligence or prior reference, rather it automatically assists a user to sift through his/her existing history or find other ongoing chat sessions that are relevant to a topic that the user is currently discussing.

A quoting function and forking function are provided for chat services. A cache is provided to store key value pairs in a database insofar as quoting a message or a thread will be done in its entirety. The cache will be either locally or on a cloud server of the chat service provider. A local Natural Language Processing (NLP) engine may be used to interpret words on-the-fly.

Figure 1:
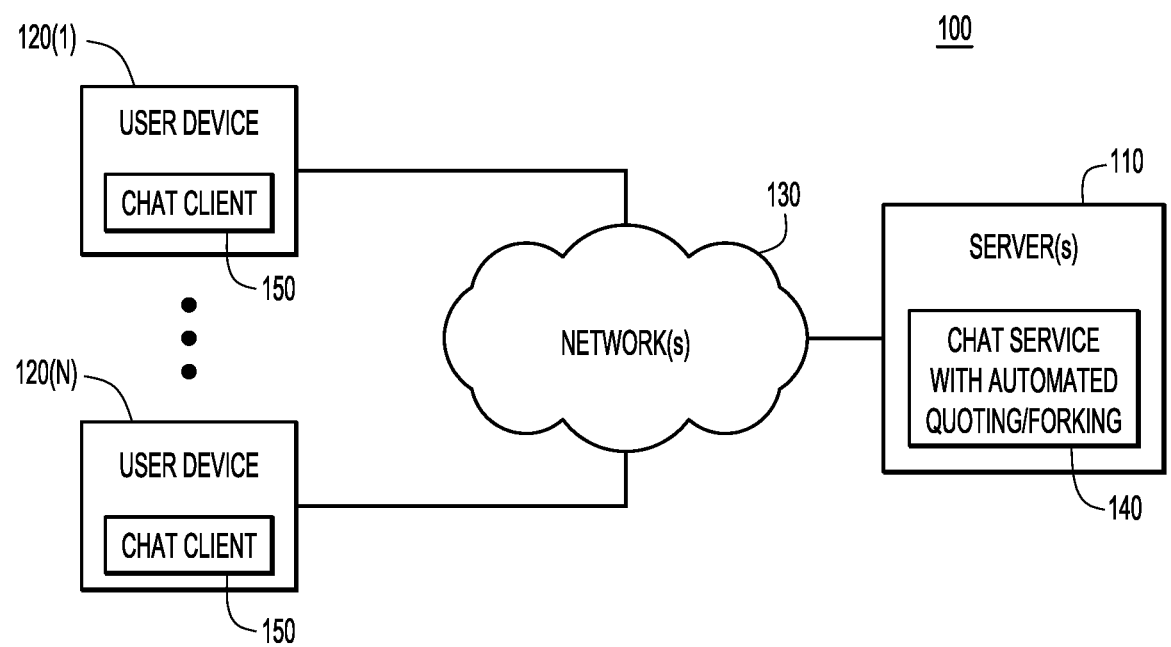
FIG. 1 is a block diagram of a system in which automatic chat session quoting or forking may be invoked, according to an example embodiment.

Reference is first made to FIG. 1. FIG. 1 shows a block diagram of a system 100 that is configured to provide chat services which include quoting function or forking function. The system 100 includes one or more servers 110 and a plurality of user devices 120(1)-120(N) that communicate with server(s) 110 via one or more networks 130. The server 110 are configured to provide a chat service 140 that is enabled with automated quoting/forking. Each user device runs a chat client 150 that interacts with the chat service 140 to provide chat sessions functionality for users of user devices 120(1)-120(N). The user devices 120(1)-120(N) may be tablets, laptop computers, desktop computers, Smartphones, virtual desktop clients, or any user device now known or hereinafter developed that can run a chat client or similar text-based communication functionality. It should be understood that the user devices 120(1)-120(N) may further include voice-to-text and text-to-voice capabilities to enable voice-based human interaction with the chat client. The user devices 120(1)-120(N) may have a dedicated physical keyboard or touch-screen capabilities to provide a virtual on-screen keyboard to enter text. The network(s) 130 may include wired local and wide-area networks as well as wireless local and wide-area networks.

At a high level, these techniques presented herein involve storing important phrases used in chat messages in key-value stores and determining the "best" possible matching threads as options to quote/fork. This is achieved without human/manual interference or involvement. It happens automatically in the background as users are engaged in chat sessions.

Figure 2:
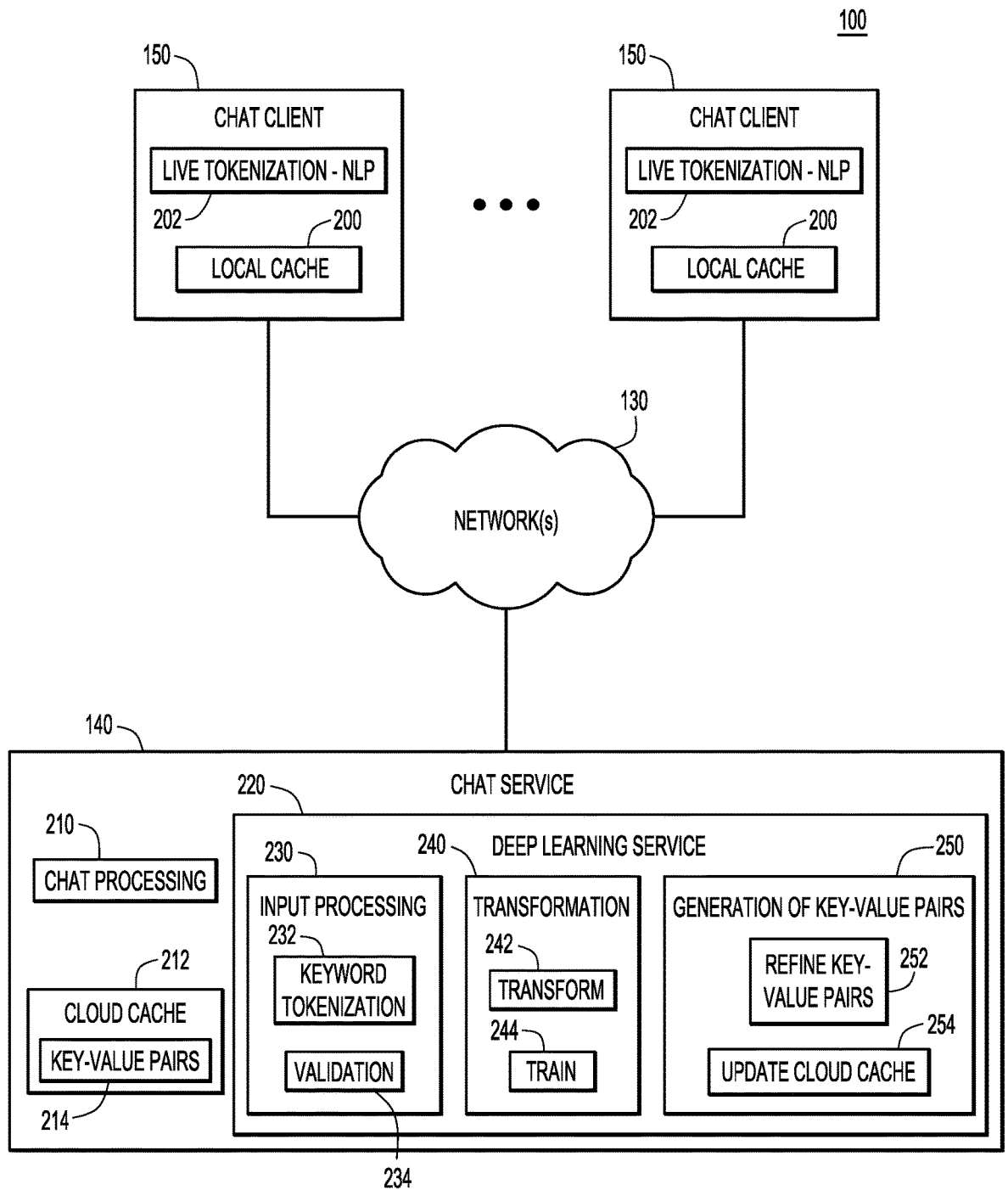
FIG. 2 is a functional architectural diagram of the system shown in FIG. 1, according to an example embodiment.

Turning now to FIG. 2, an example functional architecture is shown for the system 100. Each chat client 150 running on a user device includes a local cache 200 and a live tokenization function 202. The live tokenization function may use Natural Language Processing (NLP) techniques to recognize words and phrases in texts, convert them to key-value pairs, and comparing those key-value pairs against a database of key-value pairs stored in local cache 200.

The chat service 140 includes a chat processing function 210 that performs chat processing operations associated with the chat service 140, a cloud cache 212 that stores key-value pairs 214. There is a deep learning service 220 that may be part of the chat service 140 or a separate service running in the cloud. In either case, the deep learning service 220 is configured to learn important keywords/phrases in a conversation, identify such keywords phrases in a conversation, tag them to a key-value store and render them appropriately whenever that keyword/phrase occurs in another chat session that needs to be forked or quoted to any other user(s).

Deep learning learns through an artificial neural network that acts very much like a human brain and allows a machine to analyze data in a structure very much as humans do. Deep learning machines do not require a human programmer to tell them what to do with the data. This is made possible by the extraordinary amount of data collected and consumed. In the current example and application of deep learning models used in chatbots, deep learning is making enormous strides in language recognition—to differentiate different dialects of a language.

The chat service 140 is trained, by the deep learning service 220, to develop its own consciousness on the phrases to select based on the conversation. Alternatively, the chat service 140 may provide the phrases to look for in any conversation based on the field/topic in which the application is being used. For example, the word "issue" can be a keyword and all the messages with that phrase picked/stored and shown as a possible forking option, which reduces the challenge of the engineer to reiterate that same issue to another engineer The deep learning service 220 includes an input processing stage 230, a transformation stage 240 and a generation of key-value (K-V) pairs stage 250. The input processing stage 230 includes a keyword tokenization function 232 and a validation function 234. The keyword tokenization function 232 identifies the subject from each of the sentences in the text of the chat, which will be provided to a pool of keywords, and the validation function 234 further refines the subjects identified, at the source, in the keyword tokenization function 232, based on grammar rules of the language used.

The transformation stage 240 includes a transform function 242 and a train function 244. The transform function 242 identifies similarities of key-value pairs with existing data stored in the cloud cache 212. The train function 244 adds similar keys to the available values, in key-value pairs 214 of the cloud cache 212.

The generation of key-value pairs stage 250 includes a refine key-value pairs function 252 and an update cloud cache function 254. The refine key-value pairs function 252 makes changes to the key-value pairs 214 stored in the cloud cache 212 based on what is learned by the transformation stage 240. The update cloud cache function 254 makes updates to the cloud cache 212 as they are determined to be made by the refine existing key-value pairs function 252.

Figure 3:
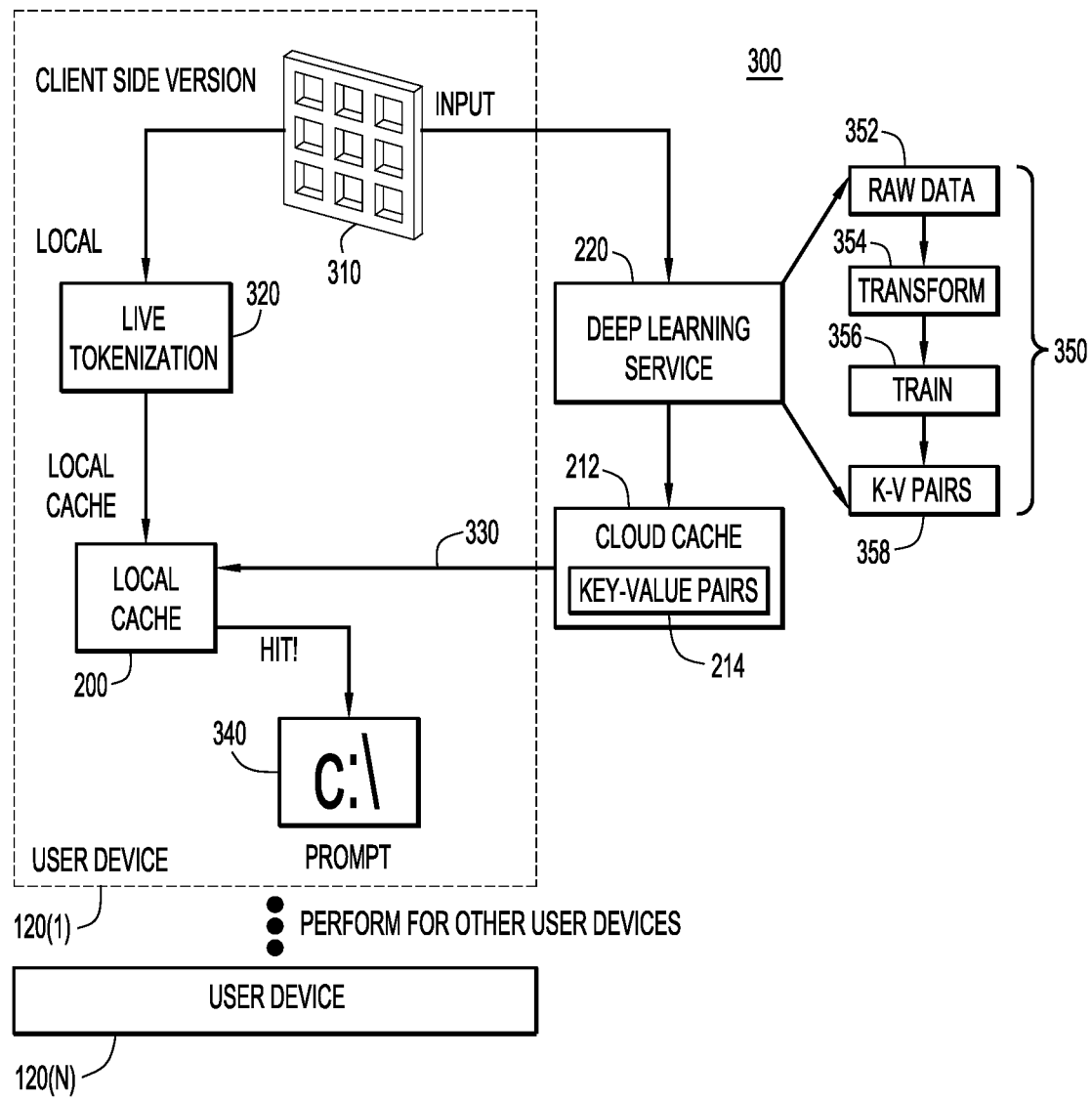
FIG. 3 is an operational flow diagram of the system shown in FIG. 1, according to an example embodiment.

FIG. 3 below illustrates a process 300 for the machine learning (deep learning) techniques that may be used to perform these operations. At 310, user input (text or voice-to-text) is obtain at a user device 120(1) as part of a chat session between a user and one or more other users. At 320, live tokenization is performed based on the text input by the user at user device 120(1), producing key-value pairs that are stored in the local cache 200. As shown at 330, the local cache 200 is updated by the cloud cache 212 based on operations performed by the deep learning service 220. When a match is made to a key-value pair in the local cache 200 between a key-value pair obtain from the live tokenization operation 320, a hit is declared resulting in a prompt 340 on the user device 120(1) as to whether the user wishes to obtain the quote associated with the text from a matching chat session or be forked to a matching chat session.

Specifically, the deep learning service 220 in the cloud obtains raw data from text input at a user device 120(1) and other user devices 120(N), as shown in FIG. 3. The deep learning service 220 performs a learning process 350 that includes obtaining raw data (text data) 352, transforming the data 354, performing training on the transformed data 356 to produce key-value pairs at 358 which are ultimately stored in the cloud cache 212 and used to update the local cache 200 on user devices. The learning process 350 is continuously running to develop and update the cloud cache 212 for new key-value pairs (representing salient terms in text communications between users), which in turn is used to update the local cache 200 on each of the user devices 120(1)-120(N).

The process 300 may operate completely in the cloud, or the local cache 200 may contain a data for a predetermined period of time (e.g., 24 hours for a predetermined number of 10 frequently contacted other users) to achieve a faster response time. If the local cache 200 becomes out-of-date, then performance may depend on the speed of the internet connection for cloud-based execution.

Privacy should not be a concern, because the chat service providers have the complete chat content anyway and this solution does not involve sharing the chat content data externally.

Example Use Cases

Figure 4C:
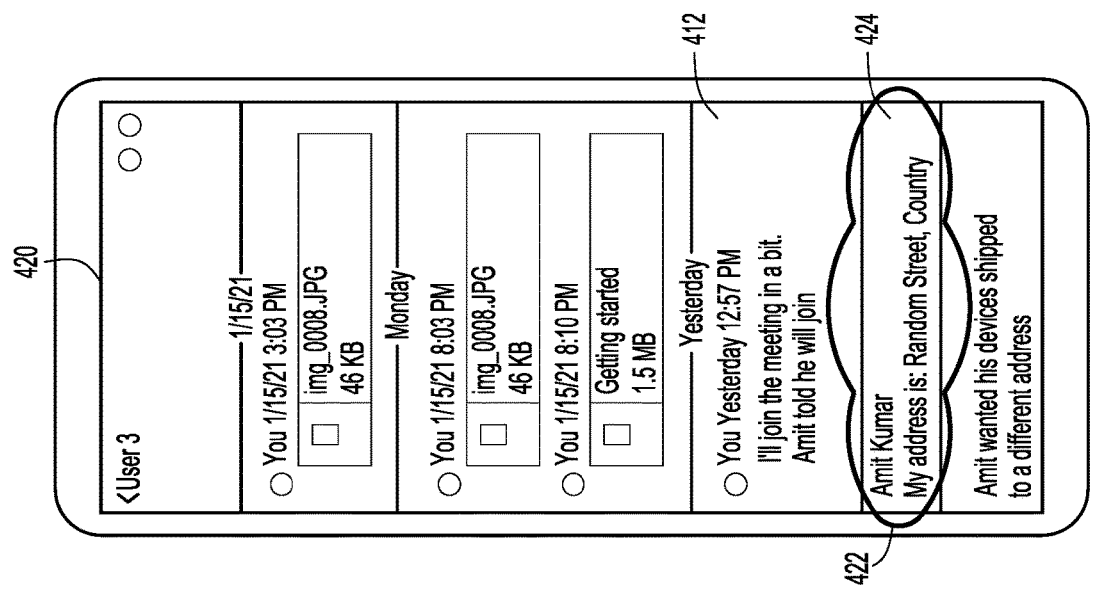
FIGS. 4A-4C illustrate example screenshots of a user interface in which a user invokes a chat quoting operation, according to an example embodiment.
Figure 4B:
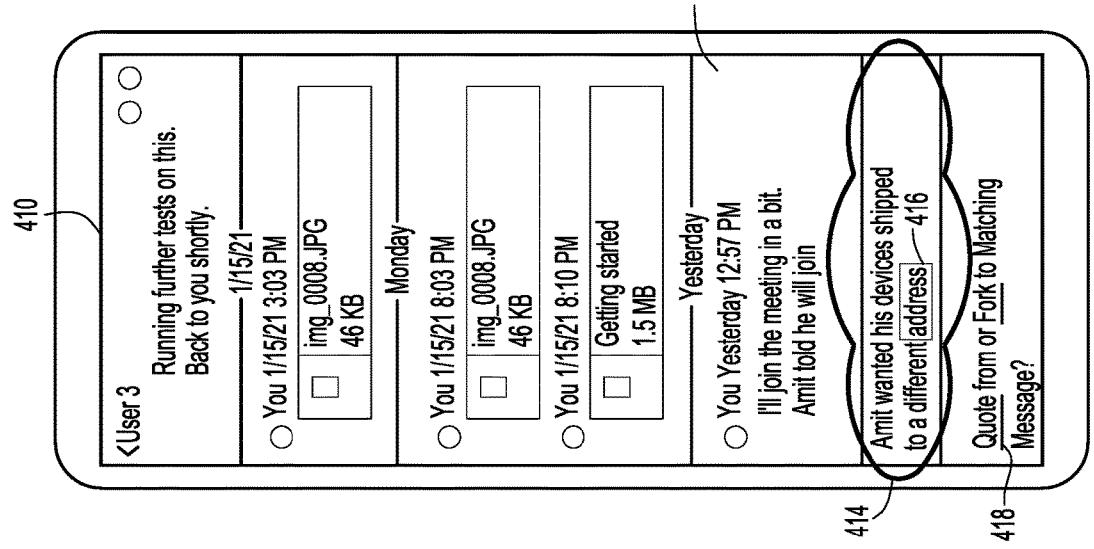
Figure 4A:
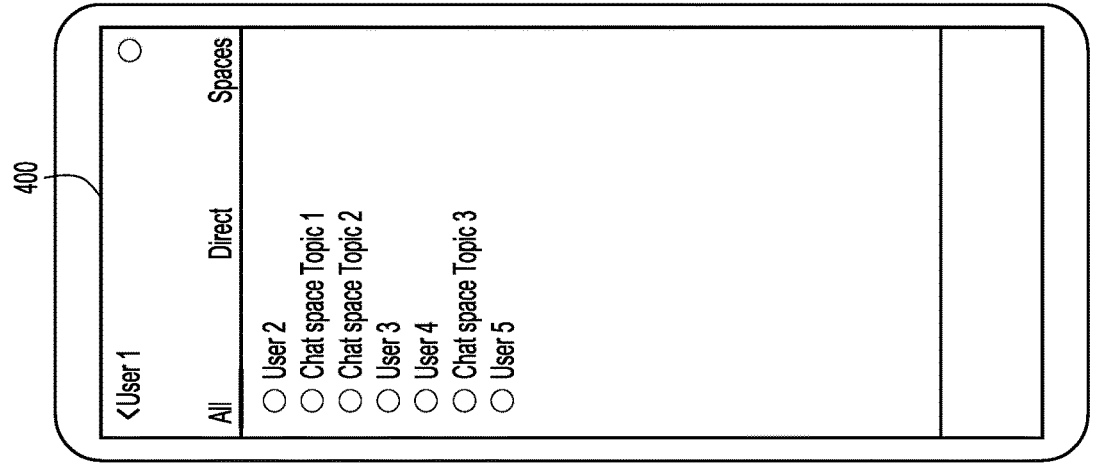

Reference is now made to FIGS. 4A-4E for a description of example use cases. These figures show example screen shots of a user interface screen of a chat client running on a user device. FIG. 4A shows a user interface screen 400 for User 1, and showing that User 1 has sessions ongoing, at some point, with User 2-5, as well as involvement in topical-based chat sessions ("spaces") for Topics 1-3. In this example, User 1 clicks on User 3 to return to a chat session with User 3.

In FIG. 4B, a user interface screen 410 is shown for the chat session User 1 is engaged in with User 3. At some point in time, as shown at 412, User 1 sends a text message "I'll join the meeting in a bit. Amit told he will join." Then, at 414, User 1 types the message "Amit wanted his devices to be shipped to a different addres-". The word "address" is flagged as a keyword for which a key-value pair is stored in the local cache of the user device for User 1, as shown at 416. The chat client application running on the user device for User 1 may generate a message 418 as a "Prompt" to User 1 as shown at 422 whereby User 1 may either (1) be presented with a quote of text from another chat session for which a match to a text message 424 was determined for an "address" for "Amit Kumar" or (2) be forked into the chat session where that text message originally appeared. The underlined text "Quote" and "Fork" in the Prompt message 418 is meant to indicate that the user can click either of those words to trigger the corresponding quoting or forking action.

FIG. 4C shows a user interface screen 420 in which User 1 has selected the quoting action from the Prompt message 418 shown in FIG. 4B. The chat client application running on the user device for User 1 presents a quote of text from another chat session for which a match to a text message 424 was determined for an "address" for "Amit Kumar". Thus, FIG. 4C shows the example in which the chat service directly quotes the message sent by "Amit Kumar" in another chat session, into the ongoing/live chat session that between User 1 and User 3, shown in FIG. 4B.

Figure 4E:
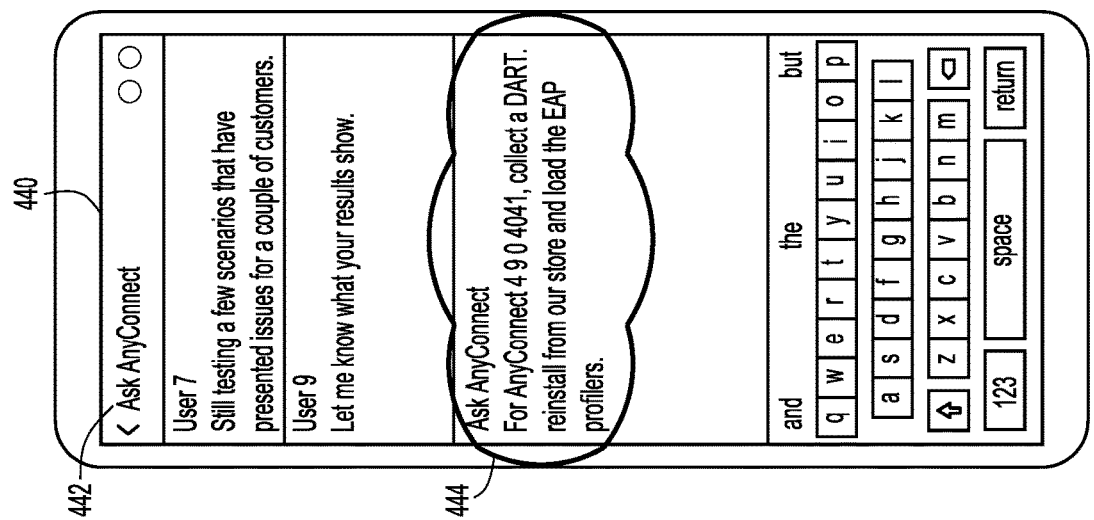
FIGS. 4D and 4E are example screenshots of a user interface in which a user invokes a chat forking operation, according to an example embodiment.
Figure 4D:
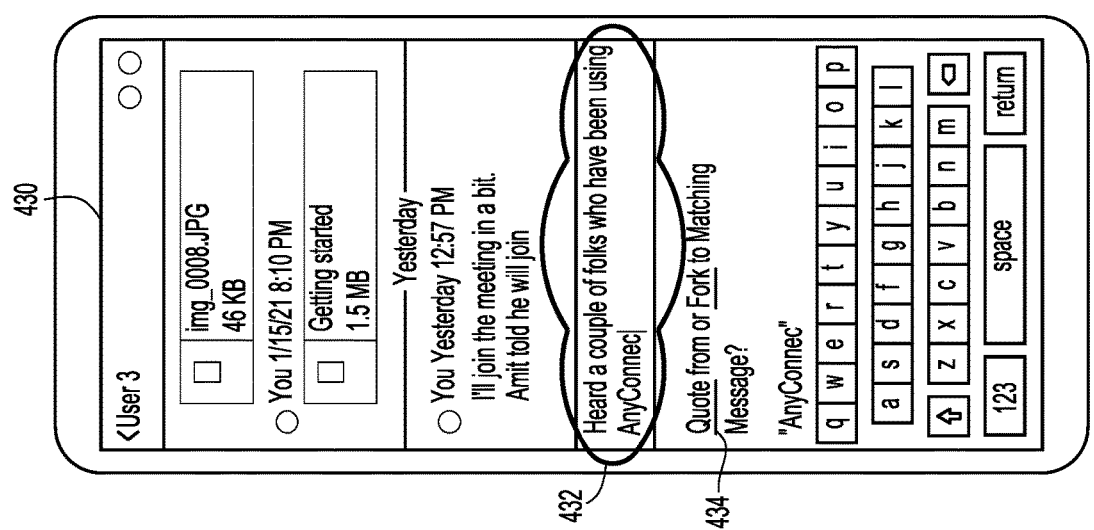

FIGS. 4D and 4E show a further example of a scenario in which the user does not remember "who", and the service needs to determine relevant keywords that from recent chats. FIG. 4D shows a user interface screen 430 in which the chat session between User 1 and User 3 is continuing. At 432, User 1 types a message "Heard a couple of folks who have using AnyConnec-" where "AnyConnect" is the keyword that is marked and used as a key-value to search against in the local cache (or cloud cache) of other chat sessions that include the term "AnyConnect". The keyword may be recognized before User 1 has even completed entering the message 432. A match is found in a topical-based chat session called "Ask AnyConnect". At 434, a Prompt message is presented to User 1 allowing User 1 to quote from the matching message in the other chat session where it appears or to be forked to that chat session. In this example, User 1 selects the "forking" option to be directed into the chat session called "Ask AnyConnect". A variation would be to have selected users from the "Ask AnyConnect" topical-based chat session pulled into the active chat at 432, in which case a new session/group would be created with the relevant messages from the "Ask AnyConnect" topical-based chat session.

FIG. 4E shows a user interface screen 440 that is presented to User 1 when he/she selects the forking option to be directed into the chat session called "Ask AnyConnect" shown at reference numeral 442. It is to be understood that User 1 has not lost his chat session with User 3, and can return to that chat session at any time, but in this example, User 1 has decided to be directed into the "Ask AnyConnect" chat session. Content associated with a current state of the second text communication session is displayed to User 1, again, because User 1 has been forked to, and added as a participant to the "Ask AnyConnect" chat session. The "Ask AnyConnect" chat session 442 has messages posted from User 7 and User 8 as shown in FIG. 4E, as well as the message 444 hat triggered that match to the keyword "AnyConnect". User 1 can send messages into the "Ask Any Connect" chat session 442 and be involves as a participant in that chat session to flesh out any questions that User 1 may have on that topic. User 1 can also return to the previous chat session that he/she was in, as shown in FIG. 4D where the text of the chat/message that was typed which triggered the quote/fork prompt was made. That is, selecting/choosing to fork to the "Ask AnyConnect" chat session 442 does not remove User 1 from the previous chat session from which the forking occurred.

Figure 5:
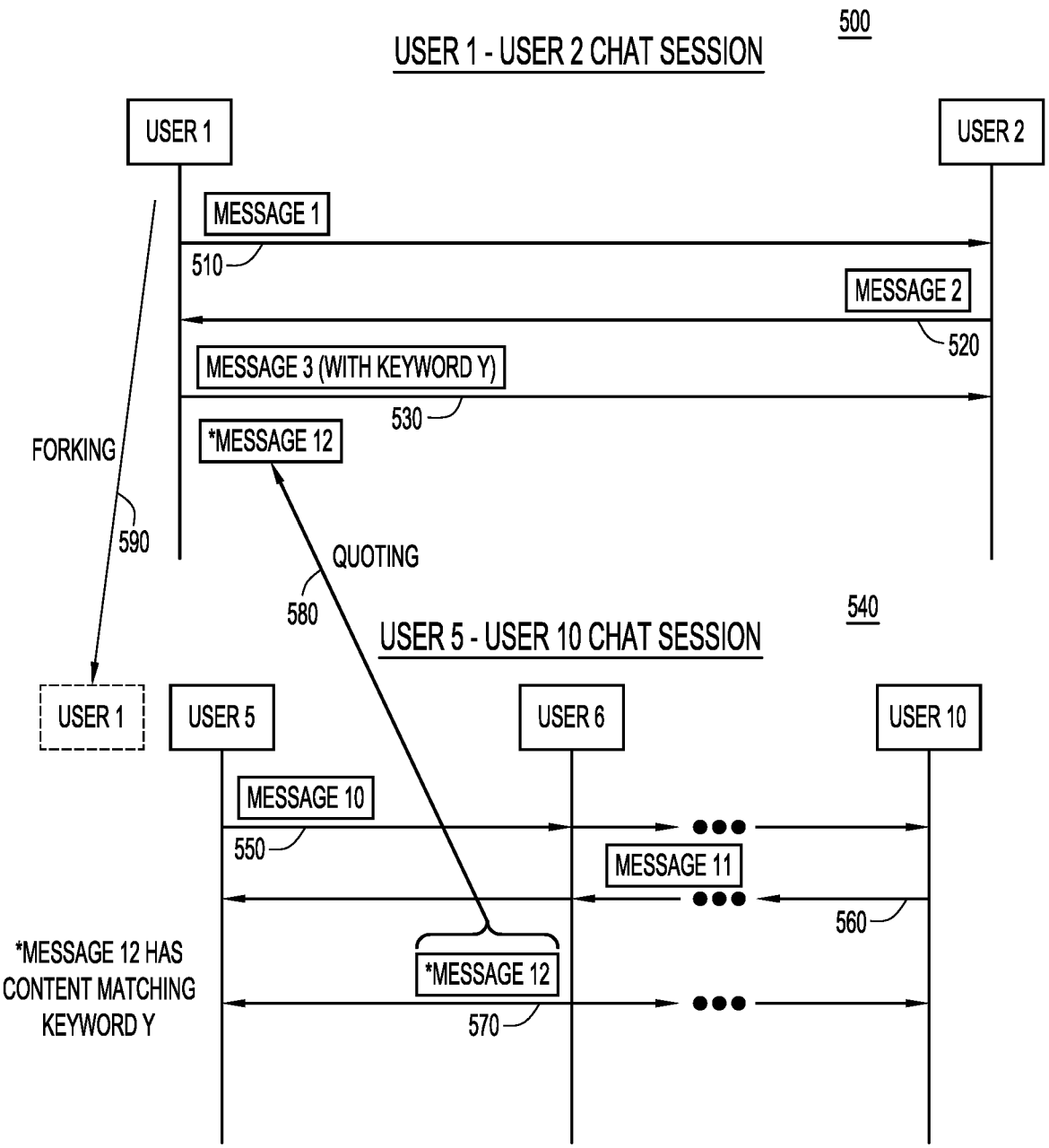
FIG. 5 is a diagram pictorially representing the quoting and forking operations, in accordance with an example embodiment.

FIG. 5 is a diagram that pictorial represents the quoting and forking operations in another way. User 1 and User 2 are in an ongoing chat session 500 with each other. At 510, User 1 sends a message (Message 1) to User 2. At 520, User 2 sends a message (Message 2) to User 1. At 530, User 1 sends a message (Message 3) to User 2. Message 3 includes a particular keyword denoted "keyword Y" which is automatically recognized and used to search a local cache at the user device of User 1 (or a cache in the cloud) to find another message in another chat session.

Indeed, Users 5-10 have been engaged in a chat session 540. At 550, User 5 sends a message (Message 10) into the chat space of chat session 540 (to Users 6-10). At 560, User 10 sends a message (Message 11) into the chat space of chat session 540. At 570, User 6 sends a message (Message 12) into the chat space of chat session 540. Message 12 has content matching keyword Y that is automatically discovered by the chat client application running of the user device of User 1 (or by a process running in the cloud). User 1 may choose to have the content of Message 12 from chat session 540 quoted, which is pictorially represented at reference numeral 580, or User 1 may choose to be forked into the chat session 540 where the matching message, Message 12, occurred. This forking operation/function is pictorially represented at reference numeral 590. Again, it is to be understood that forking does not automatically remove User 1 from chat session 500. User 1 may continue to participate in exchanges in chat session 500 after User 1 has been forked into chat session 540.

Figure 6:
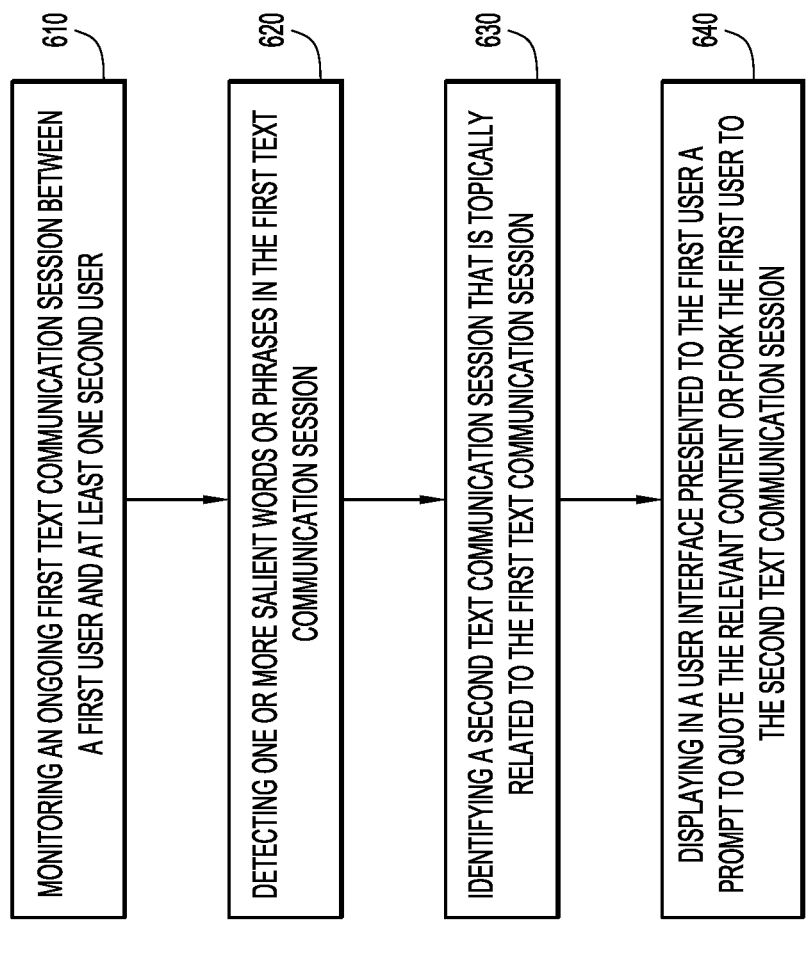
FIG. 6 is a flow chart depicting a method for automatic chat session quoting or forking, according to an example embodiment.

Turning now to FIG. 6, a flow chart is shown depicting a method 600 according to embodiments presented herein. At step 610, the method 600 includes monitoring an ongoing first text communication session between a first user and at least one second user. The first user and the second user may participate in the first text communication session by way of a chat client application running on their respective user devices.

At step 620, the method 600 includes detecting one or more salient words or phrases in the first text communication session based on the monitoring step.

At step 630, the method 600 includes, based on the one or more salient words or phrases detected in the first text communication session, identifying a second text communication session that is topically related to the first text communication session.

At 640, the method 600 includes displaying in a user interface presented to the first user, a prompt to quote relevant content from the second text communication session into the first text communication session or to fork the first user to be a participant in the second text communication session.

As depicted in FIGS. 2 and 3, the method 600 may further include operations of performing machine-learning based training based on data derived from text communication sessions from a plurality of users over time, and storing in a cloud-based cache key-value pairs associated with the one or more salient words or phrases determined based on the machine-learned based training. The operations of monitoring, detecting, identifying and displaying in steps 610, 620, 630 and 640, respectively, may be performed on a user device associated with the first user. In this case, the method 600 may further include updating a local cache on the first user device with key-value pairs stored in the cloud-based cache, and the monitoring, detecting and identifying are performed based on key-value pairs stored in the local cache.

In another form, the monitoring, detecting, and identifying steps 610, 620 and 630, respectively, are performed by "in the cloud", that is, by one or more servers that are in communication with a first user device associated with the first user and a second user device associated with the second user, and the displaying step 640 is performed on the first user device based on information sent to the first user device by the one or more servers.

In one form, the detecting step 620 includes performing tokenization of the one or more salient words or phrases to produce key-value pairs, such as by the use of NLP techniques.

As shown in FIGS. 4B and 4C, the method 600 may further include: based on the prompt, receiving user input from the first user a selection to quote the relevant content from the second text communication session into the first text communication session; and based on the user input, displaying a message or portion of a message containing the relevant content from the second text communication session in the first text communication session.

Similarly, as shown in FIGS. 4D and 4E, the method 600 may include: based on the prompt, receiving user input from the first user a selection to fork the first user to be a participant in the second text communication session; and based on the user input, adding the first user as a participant to the second text communication session and displaying to the first user content associated with a current state of the second text communication session. As described above, when the first user is forked to the second text communication session, that user may be maintained as a participant in the first text communication session.

Figure 7:
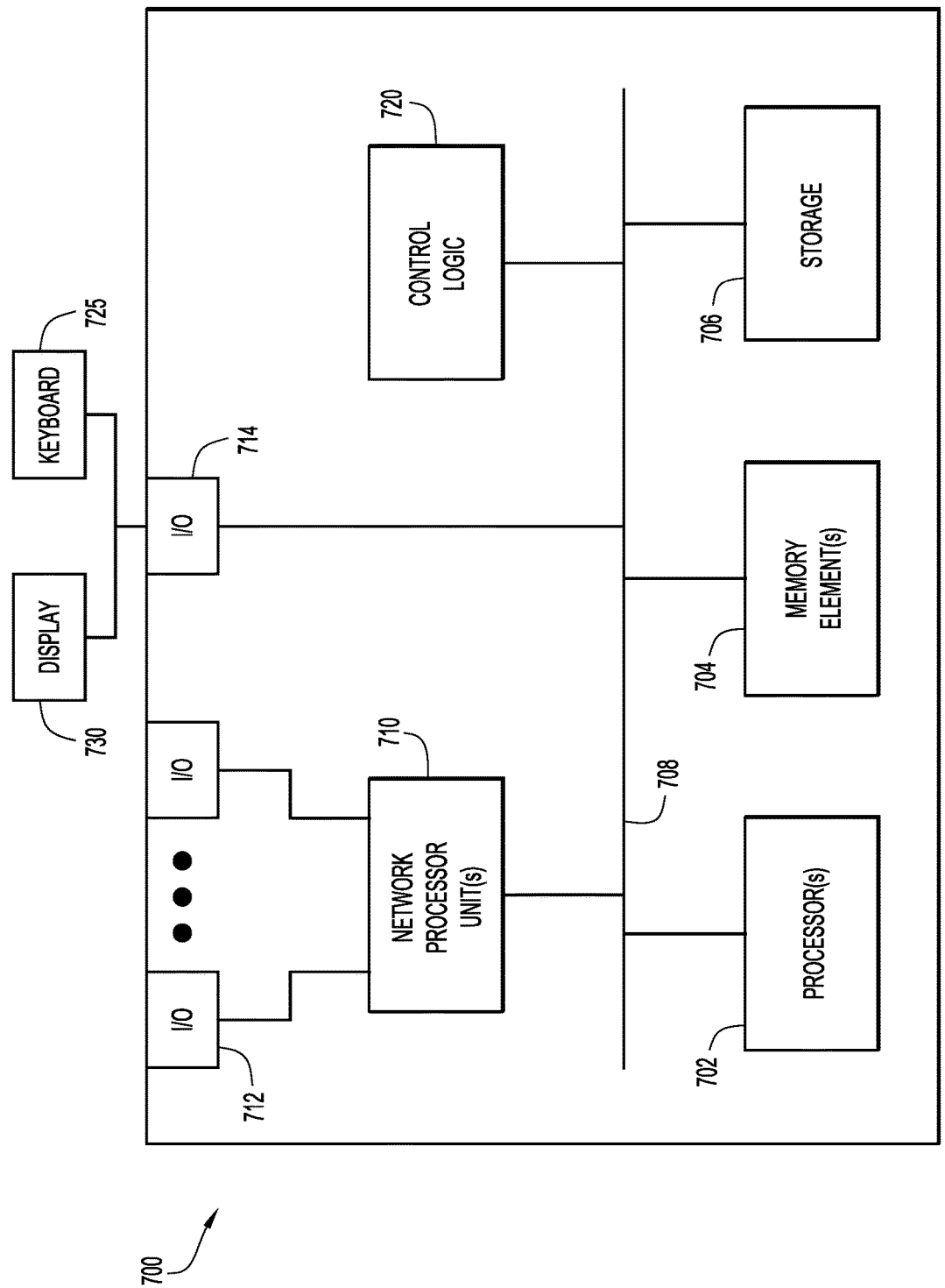
FIG. 7 is a hardware block diagram of computer device that may be configured to perform the automatic chat session quoting or forking, according to an example embodiment.

Referring to FIG. 7, FIG. 7 illustrates a hardware block diagram of a computing/computer device 700 that may perform functions associated with operations discussed herein in connection with the techniques depicted in FIGS. 1-3, 4A-4E, 5 and 6. In various embodiments, a computing device, such as computing device 700 or any combination of computing devices 700, may be configured as any devices as discussed for the techniques depicted in connection with FIGS. 1-3, 4A-4E, 5 and 6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard 725, keypad, a touch screen, and/or any other suitable input and/or output device now known or hereafter developed. This may be the case, in particular, when the computer device 700 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 730 shown in FIG. 7, particularly when the computer device 700 serves as a user device as described herein. Display 730 may have touch-screen display capabilities.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In summary, conversation is central to the chat experience, but messages do more than just communicate. With the need for more user convenience targeted these days, techniques are provided for a non-intruding auto quoting feature on-the-fly for chat applications based on previous conversations and effectively forking/quoting such conversations to ease the burden of the user going through all the chat history. The fork will not change a user's existing content instead it will help you with the viable options which can be utilized or ignored if the user thinks it is not needed. The privacy and trust remains the same as this solution explicitly uses the data that is available as part of the user chat history and it never crosses the boundary.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
monitoring an ongoing live first text communication session between a first user via a first user device and a second user via a second user device;
detecting one or more first salient words or phrases in the ongoing live first text communication session based on the monitoring of the ongoing live first text communication session;
monitoring an ongoing live second text communication session associated with a third user via a third user device, wherein the third user is different from the second user;
detecting one or more second salient words or phrases in the ongoing live second text communication session based on the monitoring of the ongoing live second text communication session;
based on comparing the one or more first salient words or phrases to the one or more second salient words or phrases, identifying the ongoing live second text communication session as being topically related to the ongoing live first text communication session;
displaying in a user interface presented to the first user a prompt to fork the first user to be a participant in the ongoing live second text communication session;
forking the first user to participate in the ongoing live second text communication session with the third user; and
returning the first user to the ongoing live first text communication session.

2. The computer-implemented method of claim 1, further comprising:
performing machine-learning based training based on data derived from text communication sessions from a plurality of users over time; and
storing in a cloud-based cache key-value pairs associated with the one or more first salient words or phrases determined based on the machine-learned based training.

3. The computer-implemented method of claim 2, wherein the monitoring the ongoing live first text communication session, the detecting the one or more first salient words or phrases, the identifying and the displaying are performed on a first user device associated with the first user, and further comprising:
updating a local cache on the first user device with key-value pairs stored in the cloud-based cache;
wherein the monitoring the ongoing live first text communication session, the detecting the one or more first salient words or phrases and the identifying are performed based on key-value pairs stored in the local cache.

4. The computer-implemented method of claim 3, wherein the detecting the one or more first salient words or phrases includes performing tokenization of the one or more first salient words or phrases to produce key-value pairs.

5. The computer-implemented method of claim 2, wherein the monitoring the ongoing live first text communication session, the detecting the one or more first salient words or phrases, and the identifying are performed by one or more servers that are in communication with the first user device associated with the first user and the second user device associated with the second user, and wherein the displaying is performed on the first user device based on information sent to the first user device by the one or more servers.

6. The computer-implemented method of claim 1, further comprising:
based on the prompt, receiving user input from the first user to fork the first user to be a participant in the ongoing live second text communication session; and
based on the user input, adding the first user as a participant to the ongoing live second text communication session and displaying to the first user, content associated with a current state of the ongoing live second text communication session.

7. The computer-implemented method of claim 6, further comprising:
maintaining the first user as a participant in the ongoing live first text communication session.

8. The computer-implemented method of claim 1, wherein the ongoing live first text communication session and the ongoing live second text communication session are chat/instant messaging sessions.

9. An apparatus comprising:
a network interface that enables network communications;
a memory; and
one or more processors configured to perform operations including:
monitoring an ongoing live first text communication session between a first user and a second user;
detecting one or more first salient words or phrases in the ongoing live first text communication session based on the monitoring of the ongoing live first text communication session;
monitoring an ongoing live second text communication session associated with a third user via a third user device, wherein the third user is different from the second user;
detecting one or more second salient words or phrases in the ongoing live second text communication session based on the monitoring of the ongoing live second text communication session;
based on comparing the one or more first salient words or phrases to the one or more second salient words or phrases, identifying the ongoing live second text communication session as being topically related to the ongoing live first text communication session;
generating for display in a user interface presented to the first user a prompt to fork the first user to be a participant in the ongoing live second text communication session;
fork the first user to participate in the ongoing live second text communication session with the third user; and
return the first user to the ongoing live first text communication session.

10. The apparatus of claim 9, wherein the one or more processors are further configured to perform operations including:
performing machine-learning based training based on data derived from text communication sessions from a plurality of users over time; and
storing in the memory, key-value pairs associated with the one or more first salient words or phrases determined based on the machine-learned based training.

11. The apparatus of claim 10, wherein the one or more processors are further configured to perform the monitoring the ongoing live first text communication session, the detecting the one or more first salient words or phrases, and the identifying based on key-value pairs stored in the memory.

12. The apparatus of claim 11, wherein the one or more processors are further configured to perform the detecting the one or more first salient words or phrases by performing tokenization of the one or more first salient words or phrases to produce key-value pairs.

13. The apparatus of claim 9, wherein the one or more processors are further configured to perform operations including:
based on the prompt, receiving user input from the first user to fork the first user to be a participant in the ongoing live second text communication session; and
based on the user input, adding the first user as a participant to the ongoing live second text communication session and generating for display to the first user, content associated with a current state of the ongoing live second text communication session.

14. The apparatus of claim 9, wherein the one or more processors are further configured to perform operations including:
maintaining the first user as a participant in the ongoing live first text communication session.

15. The apparatus of claim 9, wherein the ongoing live first text communication session and the ongoing live second text communication session are chat/instant messaging sessions.

16. One or more non-transitory computer readable storage media encoded with instructions that, when executed by a processor, cause the processor to perform operations including:
monitoring an ongoing live first text communication session between a first user via a first user device and a second user via a second user device;
detecting one or more first salient words or phrases in the ongoing live first text communication session based on the monitoring of the ongoing live first text communication session;
monitoring an ongoing live second text communication session associated with a third user via a third user device, wherein the third user is different from the second user;
detecting one or more second salient words or phrases in the ongoing live second text communication session based on the monitoring of the ongoing live second text communication session;
based on comparing the one or more first salient words or phrases to the one or more second salient words or phrases, identifying the ongoing live second text communication session as being topically related to the ongoing live first text communication session;
displaying in a user interface presented to the first user a prompt to fork the first user to be a participant in the ongoing live second text communication session;
fork the first user to participate in the ongoing live second text communication session with the third user; and
return the first user to the ongoing live first text communication session.

17. The one or more non-transitory computer readable storage media of claim 16, further comprising instructions that, when executed by the processor, cause the processor to perform operations including:
performing machine-learning based training based on data derived from text communication sessions from a plurality of users over time; and storing in a cloud-based cache key-value pairs associated with the one or more first salient words or phrases determined based on the machine-learned based training.

18. The one or more non-transitory computer readable storage media of claim 17, wherein the instructions that cause the processor to perform the detecting the one or more first salient words or phrases include instructions that cause the processor to perform tokenization of the one or more first salient words or phrases to produce key-value pairs.

19. The one or more non-transitory computer readable storage media of claim 17, further comprising instructions that, when executed by the processor, cause the processor to perform operations including:
- based on the prompt, receiving user input from the first user a selection to fork the first user to be a participant in the ongoing live second text communication session; and
- based on the user input, adding the first user as a participant to the ongoing live second text communication session and generating for display to the first user, content associated with a current state of the ongoing live second text communication session.

20. The one or more non-transitory computer readable storage media of claim 17, wherein the ongoing live first text communication session and the ongoing live second text communication session are chat/instant messaging sessions.

* * * * *